Patented Sept. 6, 1932

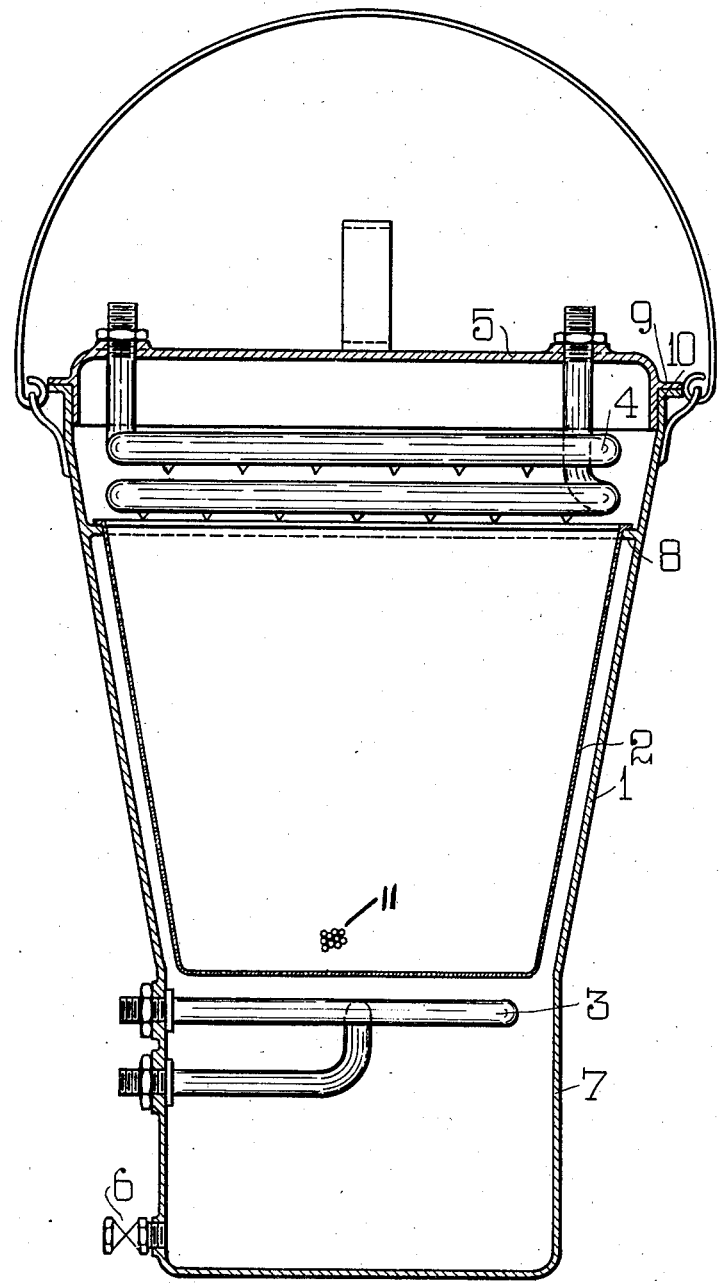

1,875,937

UNITED STATES PATENT OFFICE

JOSEPH SAVAGE, OF RUNCORN, ENGLAND

APPARATUS FOR DEGREASING MATERIALS

Application filed December 16, 1926, Serial No. 155,324, and in Great Britain June 23, 1926.

It is well known that grease may be removed from the surface of metal castings and other nonabsorbent bodies by means of solvents, and the present invention aims at providing an improved, compact and convenient form of apparatus for performing this operation with great economy of solvent and of heat.

According to the present invention an apparatus for degreasing metal and like bodies comprises a container, an extension to contain a volatile solvent in the lower portion of said container, condensing means for the volatile solvent in the upper portion of said container, and means to support the bodies to be cleaned.

Further features of the invention will be apparent from the appended claims.

Figure 1 shows a portable apparatus particularly adapted for degreasing metal castings and similar bodies not containing aqueous moisture.

In Fig. 1 the dry degreaser shown in sectional elevation consists of a metallic vessel 1 of about the size and shape of an ordinary bucket, with an extension 7 at its lower end.

Inside this there hangs a perforated frustro-conical basket 2 from a small ledge 8.

3 and 4 are water cooling coils, 4 being in the detachable lid while 3 is situated at the top of the extension 7, just below the perforated basket 2, perforated as shown at 11.

6 is a valve for the removal of oil or greasy matter.

The lid 5 has a horizontal flange 9 and a vertical flange 10 engaging with similar flanges on the walls of the casing.

In operation the material to be degreased is placed in the basket and the bottom of the vessel is filled with a volatile non-inflammable solvent e. g. trichlorethylene. The lid is placed in position. Heat is applied to the base of the vessl, and cold water is run through coil 4. The solvent distills from 7 and is condensed on the material to be degreased, excess vapours being condensed by 4. The condensed liquid drops from the coil 4 and runs down over the material to be degreased on its way back to be re-volatilized. It is desirable to effect uniform distribution of the falling liquid and this may be done by suitably shaping or disposing the cooling coil or by providing flanges or points thereon from which the liquid may drip.

When it is desired to remove the perforated container water is allowed to flow through the bottom coil to condense the vapour in the apparatus.

When the solvent is heavily contaminated with oil the perforated basket may be replaced by an imperforate container, e. g. a small bucket and the apparatus then used as a rectifier so that clean solvent collects in the bucket, while the residual oil may be drawn off from below.

The above described apparatus is very suitable for the degreasing of castings. It is very simple and portable.

I declare that what I claim is:—

1. An apparatus for degreasing metal castings and the like by the use of a suitable volatile cleaning fluid and for preventing undue loss of the cleaning fluid, which comprises a single open-topped vessel for the cleaning fluid, the lower portion of which vessel is adapted to be heated and serves as a still for initially volatilizing the cleaning fluid, said vessel having a lid adapted to be opened to permit access to the interior of the vessel, cooling means carried by the lid for condensing the vapors of the solvent to cause the condensate to fall upon the material to be degreased, means for supporting the material to be degreased below the upper cooling coil in position to receive the condensed cleaning fluid therefrom, and a second cooling coil below the said material for condensing the remaining volatile vapors, whereby undue loss of fluid is prevented when the lid is opened.

2. A unitary apparatus for degreasing metal castings and similar non-absorbent bodies with volatile solvents, comprising a single container, the lower portion of which is heated and serves as a still for initially volatilizing the solvent, a removable lid for said container having a cooling coil supported by and depending therefrom into the upper portion of the container, a second cooling coil located within the lower portion of the container, and means for supporting the material to be degreased intermediate the upper and lower cooling coils.

3. A portable apparatus for degreasing metal castings and similar non-absorbent bodies with volatile solvents, comprising in combination a container, said container being adapted to be heated externally, a removable lid for said container having a cooling coil supported by and depending therefrom into the upper portion of the container, a second cooling coil located in the lower portion of said container, and a perforated basket removably supported within the said container below said upper cooling coil and above said lower cooling coil.

4. A portable apparatus for degreasing metal castings with volatile solvents, comprising in combination a container of inverted frustro-conical shape having its base extended downwardly to form a cylindrical portion of substantial size, a removable lid for said container having a cooling coil supported by and depending therefrom into the upper portion of the container and an inverted frustro-conical perforated basket removably supported within the inverted frustro-conical portion of the container and having its upper surface substantially below the first mentioned cooling coil, and means for drawing off liquid from the bottom of said cylindrical portion of the container.

5. A portable apparatus for degreasing metal castings with volatile solvents, comprising in combination a container of inverted frustro-conical shape having its base extended downwardly to form a cylindrical position of substantial size, a removable lid for said container having a cooling coil supported by and depending therefrom into the upper portion of the container, liquid distributing flanges on said cooling coil, and an inverted frustro-conical perforated basket removably supported within the inverted frustro-conical portion of the container and having its upper surface substantially below the first mentioned cooling coil, means for drawing off liquid from the bottom of said cylindrical portion of the container, and a handle by which the apparatus may be carried about.

In witness whereof, I have hereunto signed my name this 23rd day of November, 1926.

JOSEPH SAVAGE.